US012803896B2

(12) United States Patent
Peng

(10) Patent No.: US 12,803,896 B2
(45) Date of Patent: Nov. 17, 2026

(54) ROUTE DETERMINATION METHOD, ELECTRONIC DEVICE, AND COMPUTER READABLE STORAGE MEDIUM

(71) Applicant: ZTE CORPORATION, Shenzhen (CN)

(72) Inventor: Shaofu Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 183 days.

(21) Appl. No.: 18/833,900

(22) PCT Filed: Jan. 19, 2023

(86) PCT No.: PCT/CN2023/073144
§ 371 (c)(1),
(2) Date: Jul. 28, 2024

(87) PCT Pub. No.: WO2023/143369
PCT Pub. Date: Aug. 3, 2023

(65) Prior Publication Data

US 2025/0150381 A1 May 8, 2025

(30) Foreign Application Priority Data

Jan. 28, 2022 (CN) ......................... 202210108264.3

(51) Int. Cl.
*H04L 45/121* (2022.01)
*H04L 43/0852* (2022.01)

(52) U.S. Cl.
CPC ........ *H04L 45/121* (2013.01); *H04L 43/0852* (2013.01)

(58) Field of Classification Search
None
See application file for complete search history.

(56) References Cited

U.S. PATENT DOCUMENTS

2010/0271950 A1 10/2010 Dominguez Romero
2019/0132234 A1 * 5/2019 Dong ...................... H04L 45/03
(Continued)

FOREIGN PATENT DOCUMENTS

CN 104486250 A 4/2015
CN 106533960 A 3/2017
(Continued)

OTHER PUBLICATIONS

WIPO, International Search Report issued on Apr. 23, 2023.
(Continued)

*Primary Examiner* — Fadi Haj Said
(74) *Attorney, Agent, or Firm* — Li & Cai Intellectual Property (USA) Office

(57) ABSTRACT

The present disclosure provides a route determination method, including: determining at least one candidate path in a target network; determining a deterministic delay of each candidate path according to a current scheduling parameter, an intra-node forwarding delay and a link propagation delay; the current scheduling parameter includes a current Deadline scheduling delay and a current scheduling policy, the deterministic delay of each candidate path includes node delays of all intermediate nodes in the candidate path and link propagation delays of all links in the candidate path, the node delay of each intermediate node is obtained according to the intra-node forwarding delay of the intermediate node, the current Deadline scheduling delay and the current scheduling policy; and selecting a target path from the at least one candidate path according to the deterministic delay, and determining a route. The present disclosure further provides an electronic device, a computer-readable storage medium.

20 Claims, 4 Drawing Sheets

(56) References Cited

U.S. PATENT DOCUMENTS

| | | | | |
|---|---|---|---|---|
| 2019/0356600 | A1* | 11/2019 | Barton | H04B 7/14 |
| 2021/0297362 | A1* | 9/2021 | Eckert | H04L 47/32 |
| 2021/0306910 | A1* | 9/2021 | Guo | H04W 28/0908 |

FOREIGN PATENT DOCUMENTS

| | | | | | |
|---|---|---|---|---|---|
| CN | 106878170 A | | 6/2017 | | |
| CN | 107888490 A | | 4/2018 | | |
| CN | 112671495 A | | 4/2021 | | |
| CN | 113395210 A | | 9/2021 | | |
| CN | 113542123 A | | 10/2021 | | |
| CN | 114051001 A | * | 2/2022 | | H04L 47/12 |

OTHER PUBLICATIONS

ZTE Corporation, "Discussion on low latency scheduling in IAB", 3GPP TSG RAN WG2 Meeting #106, May 3, 2019.

European Patent Office, the extended European search report dated Nov. 19, 2025, for corresponding EP application No. 23746250.2.

The State Intellectual Property Office of People's Republic of China, the First Office Action dated Dec. 12, 2025, for corresponding CN application No. 202210108264.3.

Shaofu Peng Bin Tan Quan Xiong ZTE Corporation: "IGP Flexible Algorithm with Deterministic Routingdraft-peng-lsr-flex-algo-deterministic-rou ting-00;draft-peng-lsr-flex-algo-deterministic-rou ting-00.txt", IGP Flexible Algorithm With Deterministic Routingdraft-Peng-LSR-Flex-Algo-Deterministic-Rou ting-00; Draft-Peng-lsr-flex-algo-Deterministic-Rou ting-00.txt; Internet-Draft: Network Working Group, Inter, Jan. 13, 2022 (2022-01-13), pp. 1-11, XP015149687.

Shaofu Peng Bin Tan ZTE Corporation:"Deadline Based Deterministic Forwarding draft-peng-detnet-deadline-based-forwardin g-00; draft-peng-detnet-deadline-based-forwardin g-00.txt", Deadline Based Deterministic Forwarding Draft-Peng-Detnet-Deadline-Based-Forwardin g-00;draft-peng-detnet-deadline-based-forwardin g-00.txt; Internet-Draft: Network, Internet Engineering Task Force, IE, Jan. 10, 2022 (Jan. 10, 2022), pp. 1-13, XP015149617.

Chen L Qiang Huawei Z: "Deterministic VPN; draft-chen-detnet-det-vpn-00.txt", Deterministic VPN; draft-chen-detnet-det-vpn-00.txt; Internet-Draft: Network Working Group, Internet Engineering Task Force, IETF; Standardworkingdraft, Internet Society(Isoc) 4, Rue Des Falaises CH—,Mar. 9, 2019 (Mar. 9, 2019), pp. 1-7, XP015131591.

Xiaoting Zhang:"Energy-aware Routing Algorithm and Deterministic Bandwidth Guarantee in Data Center" , CNKI Master's Electronic Journal, Feb. 15, 2021 (Feb. 15, 2021), pp. 53-75.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |    Length     | P |             Q1            |
+-+-+-+-+-+-+-+-+-+-+-+-+-+-+-+-+-+-+-+-+-+-+-+-+-+-+-+-+-+-+-+-+
| P |           Q2              | P |             Q3            |
+-+-+-+-+-+-+-+-+-+-+-+-+-+-+-+-+-+-+-+-+-+-+-+-+-+-+-+-+-+-+-+-+
|           ... ...             | P |             Qn            |
+-+-+-+-+-+-+-+-+-+-+-+-+-+-+-+-+-+-+-+-+-+-+-+-+-+-+-+-+-+-+-+-+
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |    Length     |              Q1               |
+-+-+-+-+-+-+-+-+-+-+-+-+-+-+-+-+-+-+-+-+-+-+-+-+-+-+-+-+-+-+-+-+
|              Qn               | P |            I              |
+-+-+-+-+-+-+-+-+-+-+-+-+-+-+-+-+-+-+-+-+-+-+-+-+-+-+-+-+-+-+-+-+
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |    Length     |   Flags  |U| P |        Q      :
+-+-+-+-+-+-+-+-+-+-+-+-+-+-+-+-+-+-+-+-+-+-+-+-+-+-+-+-+-+-+-+-+
:      Q        |
+-+-+-+-+-+-+-+-+
```

FIG. 5

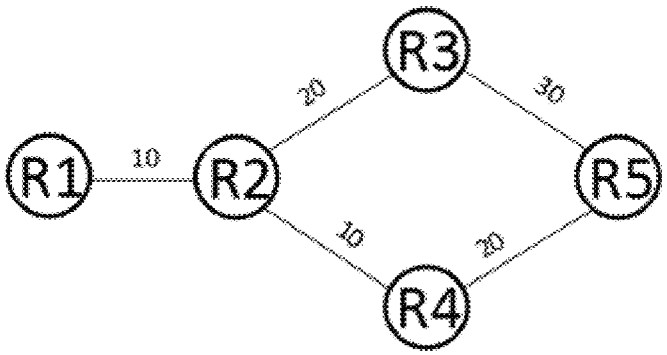

FIG. 6

ROUTE DETERMINATION METHOD, ELECTRONIC DEVICE, AND COMPUTER READABLE STORAGE MEDIUM

CROSS-REFERENCE TO RELATED APPLICATIONS

The present disclosure is a National Phase Application filed under 35 U.S.C. 371 as a national stage of PCT/CN2023/073144 filed on Jan. 19, 2023, and claims the priority of Chinese Patent Application No. 202210108264.3, filed on Jan. 28, 2022, the contents of which are incorporated herein in their entirety by reference.

TECHNICAL FIELD

The present disclosure relates to the field of routing technologies, and in particular, to a route determination method, an electronic device, and a computer readable storage medium.

BACKGROUND

In a deterministic network architecture, there are targets of quality of service (QOS) of deterministic forwarding, such as a minimum delay and a maximum delay from a head node (source node) to a destination node, and a bounded delay jitter. To achieve the targets of QoS, a deterministic path may be adopted, i.e., a strict explicit path (route) is pre-calculated, and resources are reserved at nodes (intermediate nodes) along the path to meet expectations of Service Level Agreement (SLA).

In some existing technologies, a local Deadline in each intermediate node (i.e., router) to be experienced by a traffic (packet) to be transmitted may be pre-calculated for the traffic (packet) to be transmitted, the Deadline may be an absolute time (a specific time of a clock) or a relative time (relative duration), Deadlines are formed into a stack so as to be carried along with a forwarded packet, and each intermediate node is enabled for Deadline scheduling, i.e., priority scheduling is performed on the packet according to the Deadline corresponding to the intermediate node so as to meet expectations of a deterministic delay.

However, in the existing technologies, a process of calculating the route (path) is performed according to a non-deterministic delay without considering a node delay (including a delay jitter), so that an inaccurate delay is used for calculating the route, and an optimal route is relatively difficult to be obtained.

SUMMARY

In a first aspect, embodiments of the present disclosure provide a route determination method for determining a route, including: determining at least one candidate path in a target network; determining a deterministic delay of each candidate path according to a current scheduling parameter, an intra-node forwarding delay and a link propagation delay, the current scheduling parameter including a current Deadline scheduling delay and a current scheduling policy, the intra-node forwarding delay being a delay from a packet entering to a node to the packet being forwarded to an egress port, the deterministic delay of each candidate path including node delays of all intermediate nodes in the candidate path and link propagation delays of all links in the candidate path, the node delay of each intermediate node being obtained according to the intra-node forwarding delay of the intermediate node, the current Deadline scheduling delay and the current scheduling policy; and selecting a target path from the at least one candidate path according to the deterministic delay, and determining the route.

In a second aspect, embodiments of the present disclosure provide an electronic device, including: at least one processor; a memory having at least one computer program stored thereon; and at least one I/O interface connected between the processor and the memory and configured to implement information interaction between the processor and the memory; the at least one computer program, executed by the at least one processor, causes the at least one processor to implement the route determination method in the first aspect of the present disclosure.

In a third aspect, embodiments of the present disclosure provide a computer-readable storage medium having a computer program stored thereon, the computer program, executed by a processor, causes the processor to implement the route determination method in the first aspect of the present disclosure.

BRIEF DESCRIPTION OF DRAWINGS

In the accompany drawings of the present disclosure:

FIG. 3 is a schematic diagram illustrating a TLV format of node parameter information according to embodiments of the present disclosure;

FIG. 4 is a schematic diagram illustrating a TLV format of node parameter information according to embodiments of the present disclosure;

FIG. 5 is a schematic diagram illustrating a TLV format of binding information according to the present disclosure;

FIG. 6 is a schematic diagram of a network topology structure used in an example according to embodiments of the present disclosure;

DETAIL DESCRIPTION OF EMBODIMENTS

Figure 1:
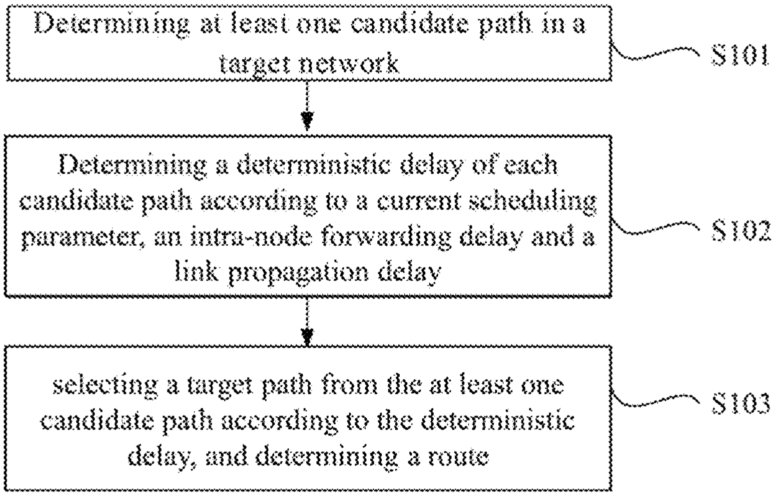
FIG. 1 is a flowchart of a route determination method according to embodiments of the present disclosure.

In order to make those skilled in the art better understand the technical solutions of the present disclosure, a route determination method, an electronic device, and a computer readable storage medium, provided in embodiments of the present disclosure, are described in detail below with reference to the accompanying drawings.

The present disclosure are described in detail below with reference to the accompanying drawings, but the exemplary embodiments may be embodied in different forms, and the present disclosure should not be construed as limited to the embodiments set forth herein. The embodiments are illustrated to make the present disclosure more thorough and complete, and for those skilled in the art more fully understanding the scope of the present disclosure.

The accompanying drawings illustrated for the embodiments of the present disclosure are used for providing further understanding to the embodiments of the present disclosure and form a part of the description, together with the exemplary embodiments of the present disclosure, are used for explaining the present disclosure, rather than limiting the present disclosure. The above and other features and advantages of the present disclosure will become more apparent to those skilled in the art by describing the exemplary embodiments in detail with reference to the accompanying drawings.

The present disclosure may be described with reference to plan and/or cross-sectional views with the help of idealized schematic illustrations of the present disclosure. Therefore, the example illustrations may be modified in accordance with manufacturing techniques and/or tolerances.

The embodiments of the present application and the technical features in the embodiments may be combined with each other if no conflict is incurred.

The terms used in the present disclosure are for a purpose of describing particular embodiments only, and do not limit the present disclosure. As used in the present disclosure, a term "and/or" includes any and all combinations of at least one of listed items. As used in the present disclosure, singular forms "a" and "the" include plural forms as well, i.e., indicate at least one, unless the context clearly defines otherwise. Terms "includes/comprises" and/or "made of/consisted of" in the present disclosure are used to specify a presence of at least one of recited features, integers, steps, operations, elements or components, but do not preclude a presence or an addition of at least one of other features, integers, steps, operations, elements, components or groups thereof.

Unless otherwise defined, meanings of all terms (including technical terms and scientific terms) used herein are the same as meanings commonly understood by one of ordinary skills in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

The present disclosure are not limited to those embodiments shown in the accompanying drawings, but include modifications of configurations formed based on a manufacturing process. Therefore, areas illustrated in the accompanying drawings have schematic properties, and shapes of the areas illustrated in the accompanying drawings illustrate specific shapes of the areas of elements, but are not limiting.

In a first aspect, embodiments of the present disclosure provide a route determination method for determining a route.

With the route determination method provided in the present disclosure, for transmitting a packet (traffic, data packet) from a head node to a destination node in a network, a deterministic route (path) of the packet is pre-calculated, i.e., which links and which intermediate nodes the packet should pass through to reach the destination node are determined.

The route determination method provided in the present disclosure may be performed by the head node, i.e., the route may be calculated by the head node.

It should be understood that the head node is called for the packet, i.e., any node in the network may act as the head node, and thus the route determination method provided in the present disclosure may actually be performed by any node in the network.

Alternatively, the route determination method provided in the present disclosure may be executed by a centralized controller in the network, that is, the controller may calculate the route and then issue the route to nodes.

It should be understood that the route determination method provided in the present disclosure further includes operations of transmitting information between nodes, so that each node obtains information (such as a current scheduling parameter in following) of the network; in a case where an operation of calculating the route is executed by the controller, the controller may obtain information (such as a network topology, the current scheduling parameter, etc.) of the network from the network side in other manners, for example, obtain the information through a Border Gateway Protocol-Link State (BGP-LS), which is not described in detail herein.

Referring to FIG. 1, the route determination method provided in the embodiments of the present disclosure includes operations S101 to S103.

At operation S101, determining at least one candidate path in a target network.

For transmitting a packet (data packet) from a head node to a destination node in a current network (target network), one or more candidate paths (deterministic paths) from the head node to the destination node are firstly calculated to be obtained.

At operation S102, determining a deterministic delay of each candidate path according to a current scheduling parameter, an intra-node forwarding delay and a link propagation delay.

The current scheduling parameter includes a current Deadline scheduling delay and a current scheduling policy, the intra-node forwarding delay is a delay from the packet entering to a node to the packet being forwarded to an egress port, the deterministic delay of each candidate path includes node delays of all intermediate nodes in the candidate path and link propagation delays of all links in the candidate path, the node delay of each intermediate node is obtained according to the intra-node forwarding delay of the intermediate node, the current Deadline scheduling delay and the current scheduling policy.

For each candidate path, an overall delay (the deterministic delay) is calculated for the candidate path.

In the route determination method provided in the present disclosure, the deterministic delay of the candidate path includes the link propagation delays of all links in the candidate path (i.e., elapsed time for transmission on the links), and node delays of all intermediate nodes (i.e., elapsed time for transmission in the intermediate nodes) in the candidate path.

The node delay of each intermediate node is calculated according to two parts, one part is the intra-node forwarding delay, and the other part is a delay caused by Deadline scheduling.

The intra-node forwarding delay refers to an elapsed time from any packet entering to the node (e.g., entering an ingress port or a control plane) to the packet reaching an egress port of a corresponding link of the node, and for each node, the elapsed time is usually a fixed value.

The delay caused by the Deadline scheduling is determined according to a currently used Deadline scheduling delay (i.e. the current Deadline scheduling delay in the current scheduling parameter) and a currently selected scheduling policy (i.e. the current scheduling policy), which means that, after reaching a queue at the egress port, the packet may be actually sent out after waiting for a certain time, but is sent out before the Deadline scheduling delay is exhausted.

At operation S103, selecting a target path from the at least one candidate path according to the deterministic delay, and determining a route.

One candidate path is selected from candidate paths according to the deterministic delay of each candidate path to serve as the target path, and the route is generated according to the target path so that a calculation of the route is completed.

Certainly, a process of sending the packet may follow according to the calculated route.

In the route determination method provided in the present disclosure, during calculating the route, both the delay (the current Deadline scheduling delay, which may vary within a certain range, i.e., delay jitter) caused by enabling the Deadline scheduling on each intermediate node and the intra-node forwarding delay are taken into account, so that the overall deterministic delay of the candidate path can be accurately obtained, and a desired reasonable route (the target path) can be accurately selected according to the deterministic delay, thereby improving the efficiency of packet transmission and ensuring a realization of the target of QoS.

In some implementations, the current scheduling policy includes any one of an in-time policy or an on-time policy; the in-time policy indicates sending the packet as soon as possible before the current Deadline scheduling delay is exhausted, and the on-time policy indicates sending the packet as close as possible to the current Deadline scheduling delay being exhausted; in response to that the current scheduling policy is the in-time policy, the node delay of each intermediate node is greater than or equal to the intra-node forwarding delay of the intermediate node, and is less than or equal to a sum of the intra-node forwarding delay of the intermediate node and the current Deadline scheduling delay; in response to that the current scheduling policy is the on-time policy, the node delay of each intermediate node is equal to the sum of the intra-node forwarding delay of the intermediate node and the current Deadline scheduling delay.

In some implementations, there may be two candidate scheduling policies to be used as the current scheduling policy, i.e., the in-time policy and the on-time policy. The in-time policy indicates that the node may send the packet at any time before the corresponding Deadline scheduling delay is exhausted, and the on-time policy indicates that the node should send the packet at the time at which the corresponding Deadline scheduling delay is exhausted. Correspondingly, the node delay caused by the on-time policy is a sum of the intra-node forwarding delay (which is inevitably existed) and the corresponding Deadline scheduling delay; and the node delay caused by the in-time policy may vary between the intra-node forwarding delay and the sum of the intra-node forwarding delay (which is inevitably existed) and the corresponding Deadline scheduling delay.

In some implementations, in response to that the current scheduling policy is the in-time policy, the node delay of each intermediate node is equal to the intra-node forwarding delay thereof; or the node delay of each intermediate node is equal to the sum of the intra-node forwarding delay of the intermediate node and the current Deadline scheduling delay.

As described above, in response to that the in-time policy is adopted, the node delay of each intermediate node may be any value within a certain range, so that the deterministic delay of the candidate path is also a variable, and it is not easy to compare the candidate paths. Therefore, in a calculation process, it may be provided that node delays of all intermediate nodes each take a minimum value or a maximum value, so that all candidate paths are compared under a same standard.

Certainly, a value of the node delay in a case where the in-time policy is adopted is not limited to the above, and for example, the value may be a random value within a current range of the node delay of each intermediate node, or an intermediate value within the current range.

In some implementations, the current Deadline scheduling delay is deterministic or non-deterministic; in response to that the current Deadline scheduling delay is deterministic, the deterministic delay of the candidate path is calculated according to a value of the current Deadline scheduling delay; and in response to that the current Deadline scheduling delay is non-deterministic, the current Deadline scheduling delay in the deterministic delay of the candidate path is counted as zero.

In some implementations, in addition to having a "specific delay value", the Deadline scheduling delay may have two different types, either deterministic or non-deterministic. The type of deterministic indicates that, for determining the deterministic delay of the candidate path, the deterministic delay is calculated according to the "specific delay value" of the current Deadline scheduling delay, and the type of non-deterministic indicates that, in a process of calculating the deterministic delay of the candidate path, the current Deadline scheduling delay is counted as zero (which does not indicate that the specific delay value is zero, but the "specific delay value" of the current Deadline scheduling delay is considered to be meaningless).

In some implementations, in response to that the current Deadline scheduling delay is non-deterministic, the route determination method further includes: after selecting the target path from the candidate paths according to the deterministic delay, calculating a deterministic delay of the target path; the deterministic delay of the target path is an expression comprising a variable representing the current Deadline scheduling delay, the value of the variable representing the current Deadline scheduling delay being determined according to a data packet or a local policy entry.

In some implementations, in response to that the current Deadline scheduling delay being non-deterministic is adopted, after any certain candidate path is determined as the target path, the deterministic delay of the target path is calculated again, in this case, the deterministic delay includes the variable representing the current Deadline scheduling delay (for the target path, the current Deadline scheduling delay is not counted as zero), and the specific delay value of the current Deadline scheduling delay may be obtained according to other manners, for example, may be determined according to the data packet or the local policy entry, so as to obtain the deterministic delay of the target path, which is calculated according to the determined current Deadline scheduling delay, and whether the target path meets expectations is to be determined according to the deterministic delay.

Figure 2:
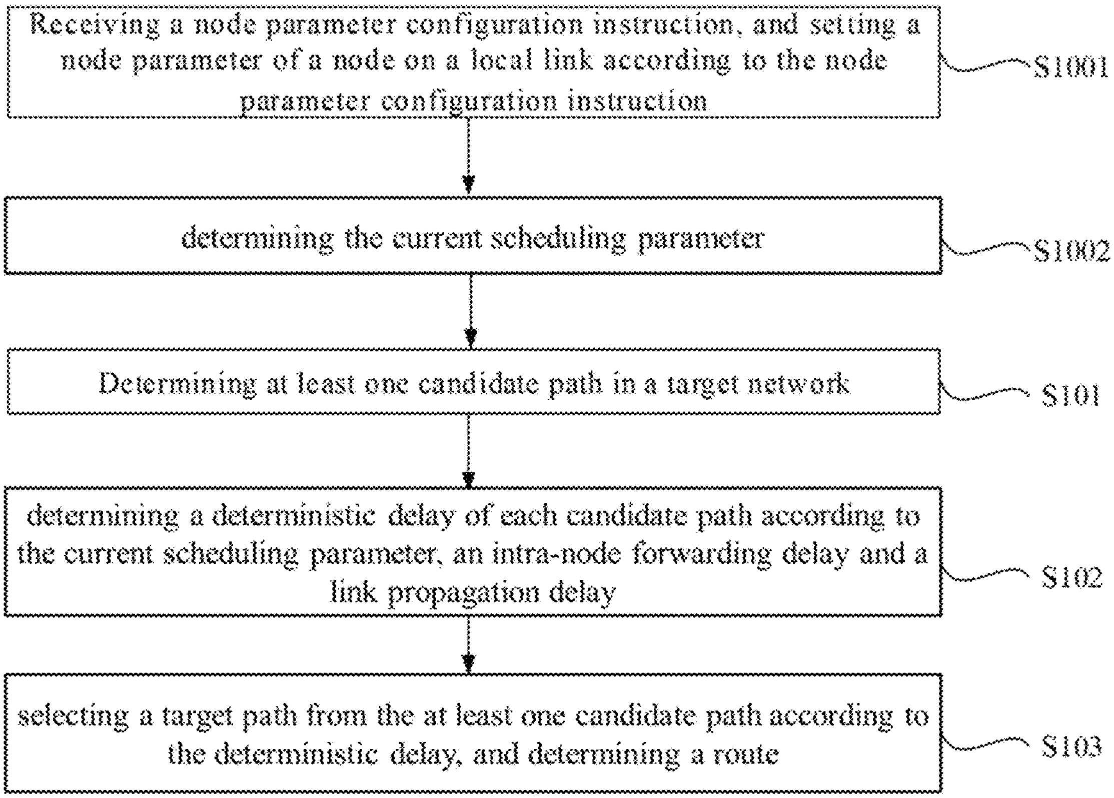
FIG. 2 is a flowchart of a route determination method according to embodiments of the present disclosure.

Referring to FIG. 2, in some implementations, before determining the at least one candidate path in the target network (operation S101), the route determination method further includes an operation S1002.

At operation S1002, determining the current scheduling parameter.

Before calculating the candidate path, the current scheduling parameter to be used may be determined according to a current situation, so as to calculate the candidate path according to the determined current scheduling parameter.

Certainly, it is also feasible that if the current scheduling parameter is a fixed parameter set in advance.

Referring to FIG. 2, in some implementations, before determining the current scheduling parameter (operation S1002), the route determination method further includes an operation S1001.

At operation S1001, receiving a node parameter configuration instruction, and setting a node parameter of a node on a local link according to the node parameter configuration instruction.

The node parameter of each node on each link includes a node scheduling enabling switch, a node scheduling delay set, a node scheduling policy and the intra-node forwarding delay; the node scheduling enabling switch indicates whether the node enables Deadline scheduling, the node scheduling delay set includes at least one Deadline scheduling delay supported by the node on the local link, and the node scheduling policy indicates a scheduling policy supported by the Deadline scheduling delay.

Each local link at each node in the network is configured to operate under a certain "configuration", and a specific content of the configuration may include a content (the node parameter) related to the Deadline scheduling. That is, each node may perform the Deadline scheduling according to the corresponding "node parameter" on each local link. The node parameter of each node on each local link may include the node scheduling enabling switch (i.e., whether the node enables the Deadline scheduling on the link), the node scheduling delay set (i.e., which Deadline scheduling delay(s) the node supports on the link), the node scheduling policy (i.e., which scheduling policy or policies the node supports on the link for each Deadline scheduling delay supported by the node on the link), and the intra-node forwarding delay (i.e., intra-node forwarding delay of the node).

Therefore, before determining the current scheduling parameter, the node parameter configuration instruction may be first sent to each node, so that each node configures the node parameter thereof according to the node parameter configuration instruction.

In some implementations, between receiving the node parameter configuration instruction (S1001) and determining the current scheduling parameter (S1002), the route determination method further includes: sending node parameter information of the node on the local link; and/or receiving node parameter information sent by another node.

The node parameter information includes information of the node scheduling delay set and information of the node scheduling policy.

After setting the node parameter of the local link according to the node parameter configuration instruction, each node further advertises the node parameter thereof to other nodes (i.e., sends node parameter information), and receives node parameters of other nodes (i.e., receives node parameter information), so that each node can learn a configuration condition of the node parameters in the whole network.

The node parameter information at least includes the information of the node scheduling delay set and the node scheduling policy; certainly, the node parameter information may further includes information of the node scheduling enabling switch, information of the intra-node forwarding delay, and the like.

It should be understood that certain "parameter information" refers to that a condition of the corresponding parameter can be finally known according to the content of the information. For example, the parameter information may directly include the parameter, or the parameter may be inferred according to the content of the information. For example, the information of the node scheduling delay set may directly include values of corresponding Deadline scheduling delays, or may include a value of the intra-node forwarding delay and values of node delays for different Deadline scheduling delays, and values of Deadline scheduling delays may be calculated from the values included in the information.

In some implementations, the node parameter information is a type-length-value (TLV) in an Intermediate System to Intermediate System (ISIS) Protocol or an Open Shortest Path First (OSPF) Protocol of an Interior Gateway Protocol (IGP) message.

The node parameters may be advertised through IGP flooding, for example, TLVs 22/23/141/222/223/25 are defined in an existing ISIS protocol set (refers to RFC5305, RFC5311, RFC5316, RFC5120) for advertising an adjacency relationship, and the route determination method provided in the present disclosure may add a Sub-TLV to those TLVs for advertising the node parameter. Certainly, the advertisement may also be performed by extending a new TLV in the OSPF.

In some implementations, the TLV format of the node parameter information includes: a type field configured to indicate that the TLV is the node parameter information; a length field configured to indicate a length of content of the TLV; and a value of each Deadline scheduling delay in the node scheduling delay set and an indication of the scheduling policy supported by the Deadline scheduling delay.

Referring to FIG. 3, in some implementations, the TLV format configured to advertise the node parameter information may include: a type field (the field of Type in FIG. 3) indicating that the TLV is the node parameter information; a length of content of the TLV (the field of Length in FIG. 3) indicating a length of the content (excluding the field of Type and the field of Length) of the TLV; a value of each Deadline scheduling delay in the node scheduling delay set (Q1, Q2 . . . . Qn in FIG. 3); an indication of the scheduling policy supported by each Deadline scheduling delay (P prior to each Q in FIG. 3).

In some implementations, the scheduling policies supported by all Deadline scheduling delays of each node are the same, and differences between any two adjacent Deadline scheduling delays in the node scheduling delay set are the same; the TLV format of the node parameter information includes: a type field configured to indicate that the TLV is the node parameter information; a length field configured to indicate a length of content of the TLV; a value of a minimum Deadline scheduling delay and a value of a maximum Deadline scheduling delay in the node scheduling delay set; an indication of the scheduling policy supported by all the Deadline scheduling delays of the node; and the difference between any two adjacent Deadline scheduling delays in the node scheduling delay set.

Referring to FIG. 4, in some implementations, in response to that the scheduling policies supported by all the Deadline scheduling delays are the same, and differences between any two adjacent Deadline scheduling delays are the same (or with "a fixed interval"), in order to reduce a length of the packet for the advertisement, the TLV format configured to advertise the node parameter information may also include: a type field (the field of Type in FIG. 4) indicating that the TLV is the node parameter information; a length field (the field of Length in FIG. 4) indicating a length of content (excluding the field of Type and the field of Length) of the TLV; a value (Q1 in FIG. 4) of a minimum Deadline scheduling delay and a value (Qn in FIG. 4) of a maximum Deadline scheduling delay in the node scheduling delay set; an indication (P in FIG. 4) of the scheduling policy supported by all the Deadline scheduling delays; and a fixed interval (I in FIG. 4) between any two adjacent Deadline scheduling delays in the node scheduling delay set.

From the above, all other Q can be calculated according to the above Q1, Qn, and I.

Certainly, a specific form of the node parameter information is not limited to the above example, as long as the node parameter information actually includes expected information.

In some implementations, determining the current scheduling parameter (operation S1002) includes operations S10021 and S10022.

At operation S10021, receiving binding information.

The binding information includes at least one group of binding relationships, each group of binding relationships includes one preset virtual network and a scheduling parameter corresponding to the preset virtual network, the scheduling parameter corresponding to the preset virtual network includes a Deadline scheduling delay and a scheduling policy corresponding to the preset virtual network, and each node in the preset virtual network supports the Deadline scheduling delay and the scheduling policy corresponding to the preset virtual network on each link.

At operation S10022, in response to that a current network is the preset virtual network, determining the scheduling parameter corresponding to the preset virtual network as the current scheduling parameter.

In some implementations, one or more "preset virtual network(s) (which may be any virtual network different from an original physical network, such as IGP multi-topology, IGP flexible algorithm, network slice, etc.)" may be pre-created, and each preset virtual network has corresponding (or bound) scheduling parameters, i.e., there is a binding relationship between the preset virtual network and the scheduling parameters.

Furthermore, the binding information may be sent to at least part of nodes, and the binding information defines the binding relationship described above; therefore, in a case where a candidate path is to be selected for transmitting a packet in a certain preset virtual network, the scheduling parameter bound with the preset virtual network may be directly adopted as the current scheduling parameter.

It should be understood that since the preset virtual network is bound with the scheduling parameter, any node (link) in the preset virtual network supports the scheduling parameter corresponding to the preset virtual network. For example, any node (link) without enabling the Deadline scheduling may not enter any preset virtual network, or any node (link) that does not support the Deadline scheduling delay and the scheduling policy corresponding to the preset virtual network may not enter the corresponding preset virtual network.

In some implementations, selecting the target path from the at least one candidate path according to the deterministic delay (S103) includes: selecting the target path from the at least one candidate path according to a Shortest Path First (SPF) algorithm according to the deterministic delay.

For the preset virtual network described above, the target path may be selected from candidate paths according to the SPF algorithm, that is, the target path is an SPF path.

The binding relationship described above may be directly configured on part of nodes of each preset virtual network, and then is advertised and learned through IGP, so that nodes in an entire IGP domain are made to achieve a consistent understanding of the binding relation.

In some implementations, the binding information is a TLV included in an IGP message, the TLV format of the binding information includes at least Flexible Algorithm Definition (FAD), IGP multi-topology, or IGP network slice.

In some implementations, the TLV format of the binding information includes: a type field configured to indicate that the TLV is the binding information; a length field configured to indicate a length of content of the TLV; an indication configured to indicate that the Deadline scheduling delay corresponding to the preset virtual network is deterministic or non-deterministic; in response to that the Deadline scheduling delay corresponding to the preset virtual network is non-deterministic, the current Deadline scheduling delay in a process for calculating the deterministic delay of the candidate path is zero; in response to that the Deadline scheduling delay corresponding to the preset virtual network is deterministic, the current Deadline scheduling delay in the process for calculating the deterministic delay of the candidate path is equal to the Deadline scheduling delay corresponding to the preset virtual network; a value of the Deadline scheduling delay corresponding to the preset virtual network; and an indication of the scheduling policy corresponding to the preset virtual network.

Referring to FIG. 5, in some implementations, the TLV format of the binding information described above may include: a type field (the field of Type in FIG. 5) indicating that the TLV is the binding information; a length field (the field of Length in FIG. 5) indicating a length of content (excluding the field of Type and the field of Length) of the TLV; an indication (U in FIG. 5) indicating that the Deadline scheduling delay corresponding to the preset virtual network is deterministic or non-deterministic; an indication (P in FIG. 5) of the scheduling policy corresponding to the preset virtual network; and a value (Q in FIG. 5) of the Deadline scheduling delay corresponding to the preset virtual network.

Certainly, a specific form of the binding information is not limited to the above example, as long as the binding information actually includes expected information.

In some implementations, the current network is a physical network or a virtual network; determining the current scheduling parameter (operation S1002) includes an operation S10023.

At operation S10023, receiving a scheduling parameter configuration instruction, and determining the current scheduling parameter according to the scheduling parameter configuration instruction.

In some implementations, the current scheduling parameter may be directly designated by the scheduling parameter configuration instruction in the physical network or the virtual network.

In some implementations, determining the at least one candidate path in the target network (operation S101) includes: determining at least one Traffic Engineering (TE) path as the candidate path in the target network by taking the current scheduling parameter as one of constraint conditions for calculating the route.

In a case where the current scheduling parameter is directly designated by the scheduling parameter configuration instruction, the current scheduling parameter may be used as one of the constraint conditions for calculating the route (certainly, there may be other constraint conditions), and the TE path is calculated as the candidate path, so that the obtained candidate path is the TE path.

It should be understood that since the current scheduling parameter is the constraint condition, all nodes (links) in the obtained candidate path calculated according to the current scheduling parameter support the current scheduling parameter. For example, any node (link) without enabling the Deadline scheduling, or any node (link) that does not support the current Deadline scheduling delay and the current scheduling policy would not be selected into the candidate path.

In some implementations, after selecting the target path from the at least one candidate path according to the deterministic delay (S103), the route determination method further includes: creating a forwarding entry for the target path; the forwarding entry including an attribute indicating that the target path enables the Deadline scheduling; an attribute indicating a value of the current Deadline scheduling delay; an attribute indicating the current scheduling policy; and an attribute indicating a value of the deterministic delay of the target path.

In some implementations, the forwarding entry further includes: an attribute indicating a value of delay jitter of the target path; the delay jitter of the target path being a sum of delay jitter of all intermediate nodes in the target path, and the delay jitter of each node being equal to a difference between an earliest possible time and a latest possible time of the node for sending the packet; an attribute indicating a value of a sum of link propagation delays of all links in the target path; and an attribute indicating a value of a sum of node delays of all the intermediate nodes in the target path.

In the route determination method provided in the present disclosure, after determining the target path, the head node (or the controller) may further create a forwarding entry of the target path to guide actual forwarding of the packet. The forwarding entry includes information related to the target path, for example, may include a key value and forwarding information as follows.

Key value: Prefix-D (D indicates the destination node)
Forwarding information: next_hop = downstream neighbor
Interface = egress port connected to the next hop
(or, the above two pieces of forwarding information may be replaced by other forms of forwarding information such as a Segment List)
metric_type = Min Unidirectional Link Delay or Deadline-delay
Deadline Flag = TRUE (indicating that candidate path enables Deadline scheduling)
Scheduling Delay = current Deadline scheduling delay
Scheduling Policy = current scheduling policy
total_metric = deterministic delay of target path
total_metric_variation = delay jitter of target path
total_metric_intra_node = accumulated node delay of target path
total_metric_link = accumulated link propagation delay of target path.

It should be understood that other intermediate nodes may also create corresponding forwarding entries accordingly.

An overall procedure of the route determination method provided in the present disclosure is exemplarily described below, by taking the method including operations 1 to 3-2 as an example.

At operation 1, on each node, configuring a node parameter based on Deadline scheduling of a local link thereof (physical link or virtual link), the node parameter including a node scheduling enabling switch, an intra-node forwarding delay, a node scheduling delay set (including one or more Deadline scheduling delays supported by the local link), and a scheduling policy supported by each element (the Deadline scheduling delay) in the node scheduling delay set.

Then, the node advertises the node parameter configured locally as described above to the network through IGP flooding, and receives node parameters advertised by other nodes.

The meaning of each node parameter is as follows.

The intra-node forwarding delay refers to a time duration consumed by forwarding a packet from an ingress port to an egress port, or from a control plane to the egress port, which is generally a fixed value, and is denoted as F.

The node scheduling delay set refers to a set <Q1, Q2 . . . . Qn> consisting of one or more Deadline scheduling delays Q, Q1 is minimum and Qn is maximum. Generally, a difference between any two adjacent elements in the set is fixed, i.e., Q2 is obtained by incrementing from Q1 at a fixed interval I.

The node scheduling enabling switch is configured to determine whether to enable the capability of Deadline scheduling for a physical link or virtual link in a physical network, if the capability of Deadline scheduling is enabled, the packet to be forwarded through the link is to be scheduled by adopting a packet scheduling algorithm based on the Deadline scheduling, so that a residence duration of the packet in the node does not exceed a maximum allowable residence duration A, A=intra-node forwarding delay F+Deadline scheduling delay Q.

For the scheduling policy, there are two possible scheduling policies for each Deadline scheduling delay Q, i.e., an in-time policy and an on-time policy. In response to that the in-time policy is adopted, the packet may be sent from the egress port before the scheduling delay reaches Q, that is, the node delay (actual residence duration) of the packet in the node is within a range [F, F+Q], i.e., a minimum node delay is F, a maximum node delay is equal to F+Q, and the delay jitter of the node is equal to Q. In response to that the on-time policy is adopted, the packet is sent to the egress port upon the scheduling delay reaching Q, that is, the node delay of the packet in the node is equal to F+Q (the minimum node delay and the maximum node delay are both equal to F+Q), and the delay jitter of the node is equal to zero.

For the above mentioned case where the node parameters of the links are advertised in the form of node parameter information through IGP flooding, a specific form of the node parameter information may be an extended ISIS. The TLVs 22/23/141/222/223/25 packets are defined in the existing ISIS protocol set (refers to RFC5305, RFC5311, RFC5316, RFC5120) for advertising an adjacency relation, and in some implementations, a Sub-TLV may be newly added in the TLVs as the node parameter information, and is denoted as a Deadline Scheduling Sub-TLV and configured to advertise the node parameter of the link. Certainly, only in response to that the node scheduling enabling switch configured by the link under the ISIS instance of a certain node is enabled or turned on, the node is expected to advertise the Deadline Scheduling Sub-TLV for the link, otherwise, the node parameter information is not to be advertised.

FIG. 3 shows an example of an ISIS Deadline Scheduling Sub-TLV, including a type field, a length field, and a node scheduling delay set of a link.

The Type (the type field) occupies one byte, and takes a value to be distributed by the Internet Assigned Numbers Authority (IANA), so as to indicate that the TLV is a Deadline Scheduling Sub-TLV.

The Length (the length field) occupies one byte, and indicates a length of content (excluding fields of Type and Length themselves) of the TLV.

The Q indicates a node scheduling delay set <Q1, Q2 . . . . Qn> of the link, in units of μs (microseconds). The information of each Deadline Scheduling delay Q supported by the link occupies two bytes; the highest two bits indicate the scheduling policy P, and the meaning of the indication of the scheduling policy P may include as follows: 0 indicates temporarily undefined, 1 indicates that only the in-time policy is supported, 2 indicates that only the on-time policy is supported, and 3 indicates that both the in-time policy and the on-time policy are supported; the subsequent bits indicate a specific value of the Deadline scheduling delay Q.

As above, in a case where the Deadline scheduling delay Q and the scheduling policy thereof are given, by further referring to the intra-node forwarding delay F (which may actually be included in the node parameter information), the corresponding attributes of the node delay and the jitter may be derived, and thus these attributes may no longer be explicitly included in the ISIS Deadline Scheduling Sub-TLV.

It should be understood that the Deadline Scheduling delay Q advertised in the ISIS Deadline Scheduling Sub-TLV is expected to be consistent with a mechanism of Deadline queue Scheduling actually instantiated by the link on a forwarding plane, and if the forwarding plane does not instantiate the Deadline queue Scheduling supporting a certain Deadline Scheduling delay Q, but the Deadline Scheduling delay Q is advertised in the ISIS Deadline Scheduling Sub-TLV, which may cause an error in the subsequent calculation of the route.

If the node scheduling delay set <Q1, Q2 . . . . Qn> to be advertised includes many elements, a difference between any two adjacent elements in the set is a fixed interval I, and the scheduling policy supported for each element is the same, a more simplified extension manner may be adopted, i.e., as the Deadline Scheduling Simplified Sub-TLV shown in FIG. 4, the Deadline Scheduling Simplified Sub-TLV includes: a type field, a length field, a node scheduling delay set and a fixed difference value between any two adjacent elements in the node scheduling delay set.

The Type (the type field) occupies one byte, and takes a value to be distributed by the IANA, so as to indicate that the TLV is a Deadline Scheduling Sub-TLV (more specifically, a Deadline Scheduling Simplified Sub-TLV).

The Length (the length field) occupies one byte, and indicates a length of content (excluding fields of Type and Length themselves) of the TLV.

The Q indicates a node scheduling delay set <Q1, Q2 . . . . Qn> of the link, Q1 is a minimum Deadline scheduling delay in the set, Qn is a maximum Deadline scheduling delay, in units of μs, and Q1 and Qn occupy two bytes respectively.

The I occupies two bytes, and indicates a fixed difference between any two adjacent elements in the node scheduling delay set, in units of μs. The highest two bits indicate a scheduling policy P, the meaning of the indication of the scheduling policy P may include as follows: 0 indicates temporarily undefined, 1 indicates that only the in-time policy is supported, 2 indicates that only the on-time policy is supported, and 3 indicates that both the in-time policy and the on-time policy are supported.

It should be understood that, as described above, A=F+Q, thus the node parameter information may also carry a set of A, and the Deadline scheduling delay Q is to be calculated according to A and F.

It should be understood that the node parameter information may also be advertised by a TLV of the extended OSPF, and the like, and is not repeated herein.

At operation 2, creating a virtual network (i.e., a preset virtual network including any virtual network technology different from an original physical network, such as IGP multi-topology, IGP flexible algorithm, network slice and the like), binding scheduling parameters (such as Deadline scheduling delay Q and scheduling policy) expected to be used by the virtual network, and advertising and learning a binding relationship between the specific virtual network and the specific scheduling parameters through the IGP, so that nodes in an entire IGP domain achieve consistent understanding of the binding relationship.

Although different virtual network technologies are to be extended in different ways to support to be bound with specific scheduling parameters, the binding relationship may be generically expressed as: <virtual network identifier, Deadline scheduling delay Q and scheduling policy>. For example, for IGP multi-topology technologies (referring to RFC4915, RFC5120, RFC 5340), the virtual network identifier may be a multi-topology identifier (MT-ID); for IGP flexible Algorithm (IGP Flex-algo) technologies (referring to draft-ietf-lsr-flex-algo-18), the virtual network identifier may be a flexible Algorithm identifier (Flex-Algorithm); for network slice technologies (referring to draft-ietf-teas-ietf-network-slices-05), the virtual network identifier may be a network slice identifier (slice-id) or a network resource partitioning identifier (NRP-id).

In specific implementations, the above binding relationship <virtual network identifier, Deadline scheduling delay Q and scheduling policy> may be configured on one or more nodes of a same virtual network, and then the configured binding relationship is advertised in the entire IGP domain by IGP. If there are a plurality of binding relationships to be advertised for the same virtual network identifier, the node may select one of the plurality of binding relationships based on other information (e.g., a field of priority to be advertised along with the binding relationships).

It should be noted that the Deadline scheduling delay Q in the binding relationship may be a determined value (deterministic) or an unknown value (non-deterministic).

If a certain virtual network uses a specific Deadline scheduling delay Q and a scheduling policy according to the binding relation, all link resources added in the virtual network are to be checked, so that the node scheduling enabling switch is enabled or turned on, and the corresponding Deadline scheduling delay Q and the scheduling policy are supported, and the links (nodes) which do not meet conditions (i.e., the node scheduling enabling switch is not enabled or turned on, or the corresponding Deadline scheduling delay Q and scheduling policy are not supported) are excluded from the virtual network. Certainly, if the Deadline scheduling delay Q in the binding relationship is an unknown value (non-deterministic), whether the link supports the Deadline scheduling delay Q may not be determined during checking.

A specific extension manner is described below by taking IGP Flex-algo as an example for supporting binding a specific Flex-algo plane (i.e. a virtual network identified by Flex-algorithm) with specific scheduling parameters (Deadline scheduling delay Q and scheduling policy).

A scheme proposed by IGP Flex-algo allows IGP to calculate constraint-based paths in the network, defines corresponding extensions of ISIS and OSPF, which enable a router can send TLVs including Calc-Type, Metric-Type and a set of constraints on describing topology; and a combination of the Calc-Type, the Metric-Type and the constraints is called FAD. That is, the IGP Flex-algo finally constructs a virtual network (Flex-algo plane) identified by Flex-algorithm, and calculates an SPF path in the virtual network based on a specific Calc-Type and a specific Metric-Type to create an SPF route. In some implementations, the extension to IGP Flex-algo may include that: a binding scheduling parameter (Deadline scheduling delay Q and scheduling policy) may be added in the FAD, if a specific Deadline scheduling delay Q and a scheduling policy are bound with the Flex-algo plane, all link resources added in the Flex-algo plane are to be configured so that the node scheduling enabling switch is enabled or turned on and the corresponding Deadline scheduling delay Q and the scheduling policy are supported, and the links (nodes) which do not meet the conditions are excluded from the Flex-algo plane.

For example, an ISIS protocol may be extended, so that an IS-IS FAD Deadline Scheduling Sub-TLV (binding information) as shown in FIG. 5 is newly defined in an IS-IS Flexible Algorithm Definition Sub-TLV, including fields of Type, Length, Flags, U-flag, P-flag, and Q.

The Type (a type field) occupies one byte, and takes a value to be distributed by the IANA, so as to indicate that the TLV is a IS-IS FAD Deadline Scheduling Sub-TLV.

The Length (a length field) occupies one byte, and indicates a length of content (excluding fields of Type and Length themselves) of the TLV.

The Flags occupies one byte for flag bits, and currently defines two flags.

The U-flag (U) occupies one bit, and is configured to prompt that a value of the Deadline Scheduling delay Q is known (deterministic) or unknown (non-deterministic), and takes following values: 0 indicating that a value in the subsequent Q field is deterministic, and 1 indicating that a value in the subsequent Q field is non-deterministic.

The P-flag occupies two bits, indicates a scheduling policy, and may take a value as follows: 0 indicating temporarily undefined; 1 indicating an in-time policy; 2 indicating an on-time policy; 3 indicating temporarily undefined.

The Q occupies two bytes, indicates the Deadline Scheduling delay Q bound with the Flex-algorithm, in units of μs. It should be understood that if the U-flag is 1 (i.e., the value of the Deadline scheduling delay Q is unknown), the value in Q may be ignored (e.g., all 0).

It should be understood that the binding information may also be advertised by a TLV of the extended OSPF, and the like, and is not repeated herein.

At operation 3-1, taking the binding scheduling parameter as the current scheduling parameter in the virtual network, calculating an SPF path with a deterministic delay and a delay jitter by using IGP based on the current scheduling parameter, the deterministic delay and the delay jitter of the calculated SPF path including contribution parts of a propagation delay (link propagation delay) and a propagation delay jitter (actually 0 in general) of each link along the path and contribution parts of a delay (intra-node forwarding delay) and a delay jitter inside each node along the path. Such SPF path is referred to as a Deadline SPF path (the target path). Compared to an SPF path in the existing art, a metric of the Deadline SPF path is a deterministic delay metric (including deterministic accumulated node delay and link propagation delay), but the metric of the SPF Path of the existing art is a non-deterministic delay metric (the node delay is not considered therein).

Thus, a manner of calculating the Deadline SPF path may include a) and b) as follows.

a) For a plurality of candidate paths with a same source and a same destination, an accumulated deterministic delay metric of each path is calculated.

b) The candidate Path with a minimum accumulated deterministic delay metric in the plurality of candidate paths is selected as the target path, i.e., Deadline SPF path.

The IGP Flex-algo is also illustrated as an example, in the existing FAD defined by the IGP Flex-algo, although in a case where the Metric-Type is set as Min Unidirectional Link Delay, an SPF path with a minimum link propagation delay is calculated, since the node delay is not considered, a total delay and the delay jitter of the calculated SPF path are non-deterministic.

In examples of the present disclosure, a Deadline flag (D-flag) is newly added in an IS-IS Flexible Algorithm Definition Flags Sub-TLV, which indicates that the route determination method provided in the present disclosure is adopted, occupies one bit, and the D-flag is used in combination with the Metric-Type (Min Unidirectional Link Delay) in the FAD.

In a case where the D-flag is 1, the D-flag is configured to explicitly trigger a calculation of the Deadline SPF path, i.e., an SPF path with a minimum sum of the accumulated node delay and the accumulated link propagation delay, and in this case, the Deadline scheduling delay Q and the scheduling policy may be obtained according to the IS-IS FAD Deadline Scheduling Sub-TLV defined above for calculating the path.

In a case where the D-flag is 0, it indicates to calculate the SPF path with the minimum accumulated link propagation delay in the existing art (i.e., the route determination method provided in the present disclosure is not enabled).

It should be understood that the above illustrates only an exemplary extension manner, and other FAD extensions, such as a newly defined metric type, may also be possible for calculating the Deadline SPF path in the Flex-logo plane.

From the above, the deterministic delay metric of the candidate path is calculated to be equal to a sum of an accumulated node delay of all intermediate nodes in the path and an accumulated link propagation delay of all links in the path.

Assuming that the current Deadline scheduling delay Q and the current scheduling policy are obtained from the IS-IS FAD Deadline Scheduling Sub-TLV, for any intermediate node i in the candidate path, node delays are contributed as following a) and b).

a) In a case where the current scheduling policy is an in-time policy, the node delay is between F (i) and F (i)+Q (i.e., the current Deadline scheduling delay), F (i) indicating an intra-node forwarding delay of the node i.

It should be understood that an actual node delay is a range (provided that Q is not 0), but a deterministic value is expected for performing a selection and a comparison between different candidate paths, therefore there are two manners: in a first manner, the node delay takes a value of F (i); in a second manner, the node delay takes a value of F (i)+Q. The first manner described above may be adopted by default.

b) In a case where the current scheduling policy is an on-time policy, the node delay is equal to F (i)+Q.

It should be understood that if the current Deadline scheduling delay Q is non-deterministic, the current Deadline scheduling delay Q is temporarily replaced with 0 in the above calculation.

It should be understood that the deterministic delay metric of the candidate path is used to compare a plurality candidate paths and finally calculate to obtain the deadline SPF path, therefore, as described above, the deterministic delay metric of the candidate path may be adjusted appropriately, for example, if the current Deadline scheduling delay Q is non-deterministic, the current Deadline scheduling delay Q is temporarily replaced by 0 in the above calculation.

However, once the Deadline SPF path (target path) is obtained, the deterministic delay metric of the Deadline SPF path should be an actual specific delay, and as described above, for any intermediate node i in the Deadline SPF path, a node delay contributed by the node i may include Q (i.e., F (i)+Q), and if Q is an unknown value, the deterministic delay of the target path is an expression including a variable Q, instead of the actual specific delay. Therefore, a determined Deadline scheduling delay Q is to be given through other manners, for example, a value of the Deadline scheduling delay Q or other information for obtaining the value of the Deadline scheduling delay Q is carried in a forwarded data packet, or, the value of the Deadline scheduling delay Q is determined according to a preset local policy entry.

Therefore, for any intermediate node in the Deadline SPF path, the delay jitter of the node contributed by the intermediate node is as follows: a) in a case where the current scheduling policy is the in-time policy, the delay jitter of the node is Q; b) in a case where the current scheduling policy is the on-time policy, the delay jitter of the node is 0.

Further, according to the Deadline SPF path calculated in the Flex-logo plane, a Prefix forwarding entry (or, MPLS label forwarding entry, or SID forwarding entry of Segment Routing, or SRv6 Locator forwarding entry, or the like) to other destination nodes may be established in the Flex-logo plane to guide the forwarding of the packet. It should be understood that, for distinguishing from forwarding entries of other Flex-algo planes or the original physical network, the forwarding entries created in a certain Flex-algo plane may use a separate Prefix (or a separate MPLS label, or a separate SID, or a separate SRv6 Locator, etc.), for example, a forwarding entry (other label entries or SID entries are all similar) maintaining a Prefix-D to a destination node D on a head node S in a certain Flex-algo plane generally includes following contents:

```
Key value: Prefix-D (D indicates the destination node)
Forwarding information:
  next_hop = downstream neighbor
  Interface = egress port connected to the next hop
  metric_type = Min Unidirectional Link Delay
  Deadline Flag = TRUE
  Scheduling Delay = current Deadline scheduling delay
  Scheduling Policy = current scheduling policy
  total_metric = deterministic delay of target path
  total_metric_variation = delay jitter of target path
  total_metric_intra_node = accumulated node delay of target path
  total_metric_link = accumulated link propagation delay of target path.
```

It should be understood that other virtual network technologies, such as IGP multi-topology, network slice, and the like may be similarly extended and are not be described in detail herein.

At operation 3-2, in some implementations, instead of pre-binding the virtual network with the scheduling parameter, in the physical network or the virtual network, a specified scheduling parameter is directly used as the current scheduling parameter, and the scheduling parameter is taken as a constraint condition for calculate a TE path, such path is called a Deadline TE path (target path).

The deterministic delay of the TE path calculated in this case similarly includes contribution parts of the propagation delay (link propagation delay) and the propagation delay jitter (actually 0 in general) of each link along the path and contribution parts of the delay (intra-node forwarding delay) and the delay jitter inside each node along the path.

Similar to calculating the Deadline SPF path, before the target Deadline TE path is calculated, candidate TE paths are also provided to be selected, and a calculation manner of the Deadline TE path is similar to the calculation of the Deadline SPF path described above, and is not described in detail herein.

For example, the above mentioned Deadline TE path may be instantiated in the network as an RSVP-TE tunnel, a Segment Routing policy, or other forms. It should be noted that, corresponding forwarding entries are expected to be installed on each intermediate node along the Deadline TE path to guide the forwarding of the packet along the Deadline TE path, and these forwarding entries may be common and do not include information such as the current Deadline scheduling delay Q and the current scheduling policy in the constraint condition for calculating the route, therefore a value of the current Deadline scheduling delay Q (or other information for obtaining the value of the current Deadline scheduling delay Q) and the current scheduling policy are to be carried in the forwarded data packet, so that each intermediate node can perform packet scheduling based on the current Deadline scheduling delay Q and the current scheduling policy upon receiving the packet.

The route determination method provided in the present disclosure is exemplarily described below with reference to specific network topologies and numerical values.

Example 1

In the Example 1, IGP Flex-algo is used for creating a virtual network (or referred to as a Flex-algo plane), and a Deadline SPF path is calculated in the virtual network. Referring to FIG. 6, the Flex-algo plane contains five nodes (R1 node to R5 node) and links (all links are bidirectional links) connected between the nodes, data at a side of the link is a value (in units of μs, the same is applied to below) of a link propagation delay of the link.

Assuming that node parameters of the links of all nodes in the virtual network are as follows:

Node scheduling enabling switch: ON

Intra-node forwarding delay F: 5 μs

Node scheduling delay set: <10 μs, 20 μs, 30 μs, 40 μs, 50 μs, 60 μs>

Node scheduling policy: supports both in-time policy and on-time policy.

The FAD of IGP Flex-algo 128 is firstly configured, the metric type is configured as Min Unidirectional Link Delay, the Deadline Flag is configured as TRUE, scheduling parameters (for example, optimal/desired scheduling parameters negotiated by all nodes, or specified scheduling parameters) bound by the IGP Flex-algo 128 are set as follows: Deadline scheduling delay Q=10 μs, the scheduling policy is the in-time policy. Assuming that the content of the FAD is the optimal/desired FAD negotiated by all nodes in the Flex-algo 128 plane.

Figure 7:
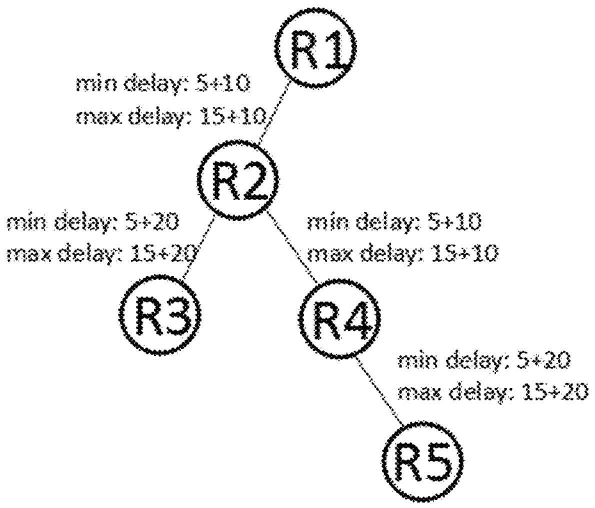
FIG. 7 is a schematic diagram of a candidate path obtained from FIG. 6.

Taking the R1 node as an example, the R1 node calculates to obtain all candidate paths by taking itself as a root (i.e, the R1 node is a head node) with reference to FIG. 7, in FIG. 7, in each group of data at a side of each link in FIG. 7, the preceding number indicates a node delay of an intermediate node prior to the link, and the posterior number indicates a link propagation delay of the link; and the min delay and the max delay indicate lower and upper limits of a deterministic delay of the link, respectively.

Therefore, for a packet with the R1 node as the head node and the R5 node as the destination node, the calculated Deadline SPF path (target path) is: R1 node-R2 node-R4 node-R5 node, and the lower limit of the deterministic delay of the path is 55 μs, the upper limit is 85 μs, and the delay jitter is 30 μs.

For example, the R5 node advertises a Prefix-R5 specific to the flex-algo 128 plane to outside, that is, following forwarding entries are created on the R1 node.

```
Key value: Prefix-R5
Forwarding information: next_hop = R2
  Interface = link-R1R2
  metric_type = Min Unidirectional Link Delay
  Deadline Flag = TRUE
  Scheduling Dealy = 10μs
  Scheduling Policy = in-time policy
  total_metric = 55 to 85μs
  total_metric_variation = 30μs
  total_metric_intra_node = 15 to 45μs
  total_metric_link = 40μs.
```

Certainly, other intermediate nodes may similarly create forwarding entries.

In a case where the intermediate node receives the data packet, if the forwarding entries described above are matched, the packet is scheduled in the node according to the Deadline scheduling delay 10 μs and the in-time policy.

Example 2

Example 2 is similar to Example 1 except that the IGP Flex-algo is changed into the IGP multi-topology or the network slice, so as to calculate a Deadline SPF path in the corresponding IGP topology or the network slice, and the specific procedures are not described in detail herein.

Example 3

Figure 8:
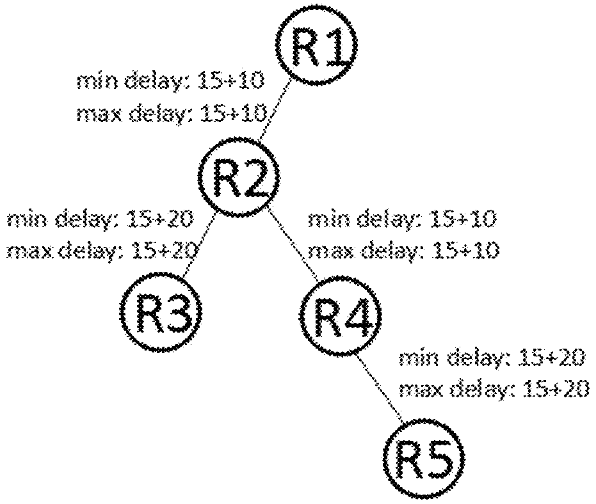
FIG. 8 is a schematic diagram of a candidate path obtained from FIG. 6.

Example 3 is similar to Example 1 except that the current scheduling policy is changed into the on-time policy, so that all calculated candidate paths refer to FIG. 8, and the min delay and the max delay in FIG. 8 are equal because the on-time policy is adopted.

Therefore, for the packet with the R1 node as the head node and the R5 node as the destination node, the calculated Deadline SPF path (target path) is: R1 node-R2 node-R4 node-R5 node, and the lower limit and the upper limit of the deterministic delay of the path are 85 μs, and the delay jitter is Ous.

Further, the forwarding entries generated by the R1 node include as follows:

```
Key value: Prefix-R5
Forwarding information: next_hop = R2
  Interface = link-R1R2
  metric_type = Min Unidirectional Link Delay
  Deadline Flag = TRUE
  Scheduling Dealy = 10μs
  Scheduling Policy = on-time
  total_metric = 85μs
  total_metric_variation = 0
  total_metric_intra_node = 45μs
  total_metric_link = 40μs.
```

Other processes are similar to Example 1 and are not be described in detail herein.

Example 4

Figure 9:
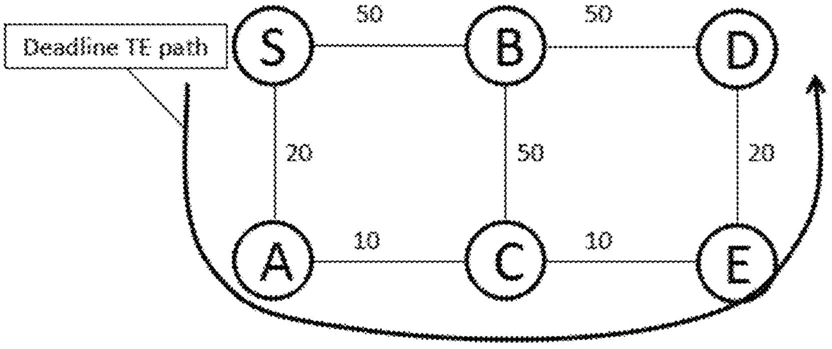
FIG. 9 is a schematic diagram illustrating a network topology structure used in an example according to embodiments of the present disclosure and a resulted target path.

In the Example 4, the Deadline TE path (target path) is created in a target network (may be a physical network or a virtual network) referring to FIG. 9.

The network shown in FIG. 9 includes six nodes (A node, B node, C node, D node, E node, and S node) and links connected between the nodes, and data at sides of the links are values of link propagation delays of the links.

Assuming that node parameters of the links of all nodes in the target network are as follows:

Node scheduling enabling switch: ON

Intra-node forwarding delay F: 5 μs

Node scheduling delay set: <10 μs, 20 μs, 30 μs, 40 μs, 50 μs, 60 μs>

Node scheduling policy: supports both in-time policy and on-time policy.

For calculating a route (SR policy) from the S head node to the D destination node, the constraint condition (current scheduling parameter) is configured to include that: the Deadline scheduling delay is 10 μs, the scheduling policy is the on-time policy.

In a case where an effect of other constraint conditions are not considered, a path calculation engine selects link resources enabled for the Deadline scheduling from a link state database to calculate the path, and finally selects the candidate path with a minimum deterministic delay metric as the target path (i.e., bolded Deadline TE path in FIG. 9), i.e., S node-A node-C node-E node-D node, the deterministic delay of the candidate path is 120 μs, an accumulated node delay of the candidate path is 60 μs, and an accumulated link propagation delay of the candidate path is 60 μs.

Therefore, following forwarding entries may be created on the S node:

```
Key value: < Heandend = S, Endpoint = D, Color =1000>
Forwarding information: Segment List = < A, C, E, D>
  metric_type = Deadline-delay
  Scheduling Dealy = 10μs
  Scheduling Policy = on-time
  total_metric = 120μs
  total_metric_variation = 0
  total_metric_intra_node = 60μs
  total_metric_link = 60μs.
```

Further, on the S node, a package corresponding to the forwarding entries is added to the data packet to be forwarded, and information indicating that the Deadline scheduling delay is 10 μs (or the node delay is 15 μs) and the on-time policy is adopted is carried in the packet, so that the packet is to be scheduled on each intermediate node along the path according to the Deadline scheduling delay 10 μs and the on-time policy.

Figure 10:
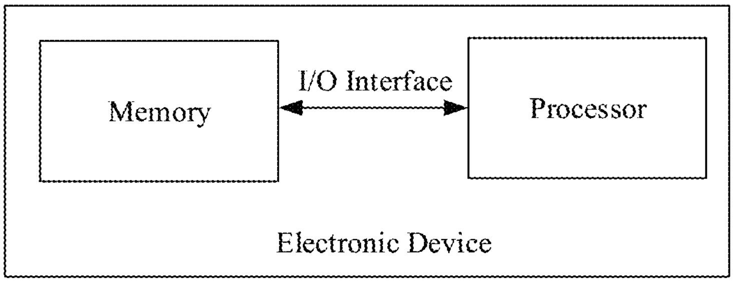
FIG. 10 is a block diagram of an electronic device according to embodiments of the present disclosure.

In a second aspect, referring to FIG. 10, embodiments of the present disclosure provide an electronic device, including: at least one processor; a memory having at least one computer program stored thereon; and at least one I/O interface connected between the processor and the memory and configured to implement information interaction between the processor and the memory; the at least one computer program, executed by the at least one processor, causes the at least one processor to implement the route determination method described in the first aspect in the present disclosure.

The processor is a device having a capability of processing data, includes, but is not limited to, a Central Processing Unit (CPU), and the like; the memory is a device having a capability of storing data, includes, but is not limited to, a random access memory (RAM, in particular, SDRAM, DDR, and the like), a read only memory (ROM), an electrically erasable programmable read only memory (EEPROM), and a FLASH; the I/O interface (read/write interface) is connected between the processor and the memory, and can implement information interaction between the processor and the memory, includes, but is not limited to, a data Bus, and the like.

In some implementations, the electronic device is a node.

As described above, the electronic device performing the route determination method provided in the present disclosure may specifically be a "node" in a network.

Certainly, as described above, for calculating a route, the electronic device performing the route determination method provided in the present disclosure may also be a controller in a network.

Figure 11:
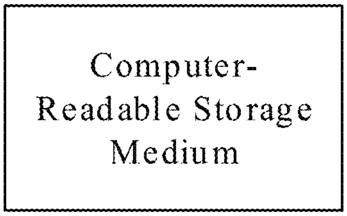
FIG. 11 is a block diagram of a computer-readable storage medium according to embodiments of the present disclosure.

In a third aspect, referring to FIG. 11, embodiments of the present disclosure provide a computer-readable storage medium having a computer program stored thereon, the computer program, executed by a processor, causes the processor to implement the route determination method described in the first aspect in the present disclosure.

It should be understood by those of ordinary skill in the art that all or some of the operations in the method described above or the functional modules/components in the device described above may be implemented as software, firmware, hardware, or suitable combinations thereof.

In a hardware implementation, the division between the functional modules/components stated above does not correspond to the division of physical components; for example, one physical component may have a plurality of functions, or one function or operation may be performed through a cooperation of several physical components.

Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). As known to those skilled in the art, the computer storage medium includes volatile/nonvolatile or removable/non-removable medium used in any method or technology for storing information (such as computer-readable instructions, data structures, program modules and other data). The computer storage medium includes, but is not limited to, a random access memory (RAM, in particular, SDRAM, DDR, and the like), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs; magnetic cassettes, magnetic tapes, magnetic disks or other magnetic storage devices; any other medium which can be used to store the desired information and can be accessed by a computer. As known to those skilled in the art, the communication medium generally includes computer-readable instructions, data structures, program modules or other data in a modulated data signal, such as a carrier wave or other transmission mechanism, and may include any information delivery medium.

The present disclosure provides the exemplary embodiments, and although specific terms are used, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A route determination method for determining a route, comprising:

determining at least one candidate path in a target network;

determining a deterministic delay of each candidate path according to a current scheduling parameter, an intra-node forwarding delay and a link propagation delay; wherein the current scheduling parameter comprises a current Deadline scheduling delay and a current scheduling policy, the intra-node forwarding delay is a delay from a packet entering to a node to the packet being forwarded to an egress port, the deterministic delay of each candidate path comprises node delays of all intermediate nodes in the candidate path and link propagation delays of all links in the candidate path, the node delay of each intermediate node is obtained according to the intra-node forwarding delay of the intermediate node, the current Deadline scheduling delay and the current scheduling policy; and selecting a target path from the at least one candidate path according to the deterministic delay, and determining the route, wherein the node delay of each intermediate node comprises the intra-node forwarding delay of the intermediate node and a delay caused by Deadline scheduling, the delay caused by the Deadline scheduling is determined according to the current Deadline scheduling delay and the current scheduling policy, the intra-node forwarding delay of the intermediate node is a fixed value for the intermediate node.

2. The method of claim 1, wherein, the current scheduling policy comprises any one of an in-time policy or an on-time policy; the in-time policy indicates sending the packet before the current Deadline scheduling delay is exhausted, and the on-time policy indicates sending the packet before the current Deadline scheduling delay being exhausted;

in response to that the current scheduling policy is the in-time policy, the node delay of each intermediate node is greater than or equal to the intra-node forwarding delay of the intermediate node, and is less than or equal to a sum of the intra-node forwarding delay of the intermediate node and the current Deadline scheduling delay;

in response to that the current scheduling policy is the on-time policy, the node delay of each intermediate node is equal to the sum of the intra-node forwarding delay of the intermediate node and the current Deadline scheduling delay.

3. The method of claim 2, wherein in response to that the current scheduling policy is the in-time policy, the node delay of each intermediate node is equal to the intra-node forwarding delay of the intermediate node; or the node delay of each intermediate node is equal to the sum of the intra-node forwarding delay of the intermediate node and the current Deadline scheduling delay.

4. The method of claim 1, wherein, the current Deadline scheduling delay is deterministic or non-deterministic; in response to that the current Deadline scheduling delay is deterministic, the deterministic delay of the candidate path is calculated according to a value of the current Deadline scheduling delay; in response to that the current Deadline scheduling delay is non-deterministic, the current Deadline scheduling delay in the deterministic delay of the candidate path is 0.

5. The method of claim 4, wherein in response to that the current Deadline scheduling delay is non-deterministic, the method further comprises: after selecting the target path from the at least one candidate path according to the deterministic delay, calculating a deterministic delay of the target path; the deterministic delay of the target path is an expression comprising a variable representing the current Deadline scheduling delay, the value of the variable representing the current Deadline scheduling delay being determined according to a data packet or a local policy entry.

6. The method of claim 1, further comprising: before determining the at least one candidate path in the target network, determining the current scheduling parameter.

7. The method of claim 6, further comprising: before determining the current scheduling parameter, receiving a node parameter configuration instruction, and setting a node parameter of a node on a local link according to the node parameter configuration instruction; the node parameter of each node on each link comprising a node scheduling enabling switch, a node scheduling delay set, a node scheduling policy and the intra-node forwarding delay; the node scheduling enabling switch indicating whether the node enables Deadline scheduling, the node scheduling delay set comprising at least one Deadline scheduling delay supported by the node on the local link, the node scheduling policy indicating a scheduling policy supported by the Deadline scheduling delay.

8. The method of claim 7, further comprising:

between receiving the node parameter configuration instruction and determining the current scheduling parameter, performing at least one of followings: sending node parameter information of the node on the local link; or receiving node parameter information sent by other nodes; the node parameter information comprising information of the node scheduling delay set and the node scheduling policy on the local link.

9. The method of claim 8, wherein, the node parameter information is a type-length-value (TLV) included in an Intermediate System to Intermediate System (ISIS) Protocol or an Open Shortest Path First (OSPF) Protocol of an Interior Gateway Protocol (IGP) message.

10. The method of claim 9, wherein the TLV format of the node parameter information comprises: a type field configured to indicate that the TLV is the node parameter information; a length field configured to indicate a length of content of the TLV; and a value of each Deadline scheduling delay in the node scheduling delay set and an indication of the scheduling policy supported by the Deadline scheduling delay.

11. The method of claim 9, wherein scheduling policies supported by all Deadline scheduling delays of each node are the same, and differences between any two adjacent Deadline scheduling delays in the node scheduling delay set are the same; the TLV format of the node parameter information comprises: a type field configured to indicate that the TLV is the node parameter information; a length field configured to indicate a length of content of the TLV; a value of a minimum Deadline scheduling delay and a value of a maximum Deadline scheduling delay in the node scheduling delay set; an indication of the scheduling policy supported by all the Deadline scheduling delays of the node; and the difference between any two adjacent Deadline scheduling delays in the node scheduling delay set.

12. The method of claim 6, wherein determining the current scheduling parameter comprises: receiving binding information; the binding information comprising at least one group of binding relationships, each group of binding relationships comprising one preset virtual network and a scheduling parameter corresponding to the preset virtual network, the scheduling parameter corresponding to the preset virtual network comprising a Deadline scheduling delay and a scheduling policy corresponding to the preset virtual network, and each node in the preset virtual network supporting the Deadline scheduling delay and the scheduling policy corresponding to the preset virtual network on each link; and in response to that a current network is the preset virtual network, determining the scheduling parameter corresponding to the preset virtual network as the current scheduling parameter.

13. The method of claim 12, wherein selecting the target path from the at least one candidate path according to the deterministic delay comprises: selecting the target path from the at least one candidate path according to a SPF algorithm according to the deterministic delay.

14. The method of claim 12, wherein the binding information is a TLV included in an IGP message, the TLV format of the binding information comprises at least one of Flexible Algorithm Definition (FAD), IGP multi-topology, or network slice.

15. The method of claim 14, wherein the TLV format of the binding information comprises:

a type field configured to indicate that the TLV is the binding information;

a length field configured to indicate a length of content of the TLV;

an indication configured to indicate that the Deadline scheduling delay corresponding to the preset virtual network is deterministic or non-deterministic; in response to that the Deadline scheduling delay corresponding to the preset virtual network is non-deterministic, the current Deadline scheduling delay in a process for calculating the deterministic delay of the candidate path is 0; in response to that the scheduling delay corresponding to the preset virtual network is deterministic, the current Deadline scheduling delay in the process for calculating the deterministic delay of the candidate path is equal to the Deadline scheduling delay corresponding to the preset virtual network;

a value of the Deadline scheduling delay corresponding to the preset virtual network; and an indication of the scheduling policy corresponding to the preset virtual network.

16. The method of claim 6, wherein a current network is a physical network or a virtual network; determining the current scheduling parameter comprises: receiving a scheduling parameter configuration instruction, and determining the current scheduling parameter according to the scheduling parameter configuration instruction.

17. The method of claim 16, wherein determining the at least one candidate path in the target network comprises: determining at least one Traffic Engineering (TE) path as the candidate path in the target network by taking the current scheduling parameter as one of constraint conditions for calculating the route.

18. The method of claim 1, further comprising: after selecting the target path from the at least one candidate path according to the deterministic delay, creating a forwarding entry for the target path; the forwarding entry comprising:

an attribute indicating that the target path enables the Deadline scheduling;

an attribute indicating a value of the current Deadline scheduling delay;

an attribute indicating the current scheduling policy; and an attribute indicating a value of the deterministic delay of the target path.

19. The method of claim 18, wherein the forwarding entry further comprises:

an attribute indicating a value of a delay jitter of the target path; the delay jitter of the target path being a sum of delay jitters of all intermediate nodes in the target path, and the delay jitter of each node being equal to a difference between a minimum node delay and a maximum node delay;

an attribute indicating a value of a sum of link propagation delays of all links in the target path; and an attribute indicating a value of a sum of node delays of all the intermediate nodes in the target path.

20. A non-transitory computer-readable storage medium having a computer program stored thereon, the computer program, executed by a processor, causes the processor to implement the route determination method of claim 1.

* * * * *